Patented Apr. 10, 1945

2,373,343

UNITED STATES PATENT OFFICE 2,373,343

TERPENE DERIVATIVES

Alfred L. Rummelsburg, Wilmington, Del., assignor to Hercules Powder Company, Wilmington, Del., a corporation of Delaware No Drawing. Original application May 31, 1941, Serial No. 396,219. Divided and this application July 8, 1943, Serial No. 493,871

11 Claims. (Cl. 260—609)

This invention relates to methods for the production of sulfur-containing terpene compounds and to the products formed thereby; more particularly, it relates to the production of sulfur-containing compounds of acyclic terpenes having three double bonds per molecule and to the products formed thereby.

In accordance with this invention, it has been found that when an acyclic terpene having three double bonds per molecule, in any of its monomeric or polymeric modifications, is reacted with alkyl mercaptans, there results a series of highly interesting and useful compounds. The reaction products themselves have important uses as flotation agents. In addition, they serve as intermediates for the preparation of plasticizers for halogenated rubber, adhesives, etc.

As stated hereinabove, any of the monomeric or polymeric forms of acyclic terpenes having three double bonds per molecule, as, for example, allo-ocimene, ocimene, myrcene, etc., may be employed in accordance with this invention. In particular, allo-ocimene is preferred inasmuch as, in addition to having three double bonds per molecule, this material has them in a triply conjugated arrangement. Hereinafter, in this specification, an acyclic terpene having three double bonds per molecule will be referred to for convenience as an acyclic terpene.

To derive a polymer of an acyclic terpene from the monomer, any of the processes known in the art may be utilized. For example, it is desired to include polymerization with phosphoric acid catalysts, such as, orthophosphoric acid, tetraphosphoric acid, hypophosphoric acid, metaphosphoric acid, pyrophosphoric acid, etc., also with metal halide catalysts, such as stannic chloride, aluminum chloride, zinc chloride, boron trifluoride and its molecular complexes with ethers and acids, etc. In addition, activated clays, including silica gel, fuller's earth, diatomaceous earth, activated alumina, etc., may be employed to accomplish the polymerization. The polymerization may be carried out with or without the use of an inert, volatile, organic solvent, such as, benzene, xylene, gasoline, ethylene dichloride, etc.

If the polymerization is carried out with phosphoric acid catalysts, a liquid product is formed containing a substantial quantity of the dimer. In actual practice, the product will contain from about 75% to 95% of the dimer, depending upon the conditions of reaction, such as, the type of phosphoric acid used, the concentration of catalyst, the particular solvent, the temperature of reaction, etc. The thiocyanate value of the product may vary from about 120 to about 240. If desired, after the catalyst has been removed, the substantially pure dimer may be separated from the remaining constituents by distillation under reduced pressure. The substantially pure dimer is the preferred form of polymeric acyclic terpene to be employed in accordance with the invention.

In carrying out the polymerization with metal halide catalysts, liquid polymers may also be obtained. However, by employing particular metal halides and suitably controlling the conditions of the reaction, solid polymers of the acyclic terpene employed result. For example, when a metal chloride, and preferably an aluminum chloride, is used, generally solid polymers result. These solid polymers are formed when the reaction is carried out over wide ranges of temperature and using various inert solvents. Preferably, however, to form solid polymers, the reaction is carried out at a temperature within the range of from about —35° C. to about 60° C. with the acyclic terpene dissolved in a halogenated organic solvent, such as, ethylene dichloride, etc.

These solid polymers which are prepared by the processes above described contain substantial quantities of polymeric constituents higher than the dimer. It has been determined that these organic solids have at least about 70% of polymeric constituents higher than the dimer. They are further characterized by having lower thiocyanate values than do the liquid polymers, the values for the former falling within the range of from about 20 to about 80.

In accordance with this invention, then, an acyclic terpene such as allo-ocimene is reacted with alkyl mercaptans. The alkyl mercaptans which may be utilized in carrying out the reaction are such alkyl mercaptans as ethyl, methyl, propyl, butyl, etc.

In carrying out the reaction, the acyclic terpene may or may not be dissolved in an inert solvent such as benzene, toluene, butanol, gasoline, etc., as desired. It is often preferable, however, when a solid polymeric form of the acyclic terpene is employed, to carry out the reaction with an inert solvent present in order to assure better contact of the reactants. Employing an acyclic terpene or its solution, the reactant is contacted with the alkyl mercaptans in the presence of a suitable catalyst. Desirably, the reaction mixture is agitated either throughout the whole or part of the reaction period. The reaction may be carried out at various temperatures and over different periods of time. While a temperature within the range of from about 0° C. to about 250° C. for a period of from about 1 hour to about 100 hours is suitable for the reaction, a temperature within the range of from about 20° C. to about 180° C. and for a period of from about 2 hours to about 24 hours, is preferably employed. Ordinarily atmospheric pressure is conveniently employed in carrying out the reaction.

As hereinbefore stated, a catalyst will be employed to promote the reaction between the acyclic unsaturated terpene and the alkyl mercaptans. Suitable catalysts comprise acids, such as, sulfuric acid, phosphoric acid, acetic acid, etc.; acid anhydrides, such as, phosphorus pentoxide, etc.; bases, such as, potassium hydroxide, sodium hydroxide, monoamylamine, diamylamine, triamylamine, the ethanolamines, aniline, pyridine, etc.; contact catalysts, such as, activated carbon, silica gel, etc.; dimethyl sulfate; metallic aluminum; and metal sulfides. In addition, various combinations of catalysts may be used in place of a single catalyst. It is preferred in carrying out the reaction inherent in this invention to use an acid catalyst, and it is still further preferred that such a catalyst be used in conjunction with a contact catalyst, such as, activated charcoal, silica gel, fuller's earth, activated magnesium silicate, bauxite, activated alumina, etc. If desired, certain of these contact catalysts may, prior to use, be calcined at temperatures between about 250° C. and about 500° C.

The amount of catalyst to be employed, when required, may be varied from about 0.01 to about 2.00 times the amount of acyclic terpene used; however, some reaction will take place when greater or lesser amounts of the catalyst are employed. The mineral acid catalysts, when such are employed, will desirably be employed in the form of their aqueous solutions having a mineral acid concentration within the range of from about 20 to about 100%. When sulfuric acid is employed as the catalyst, however, it is preferably employed in the form of a solution having a concentration with respect to the sulfuric acid not greater than 75%. Otherwise, sulfonation of the acyclic terpene may take place. When using mineral acids as catalysts, it is advisable to add the catalyst at intervals during the progress of the reaction rather than all at once at the start of the reaction. These acid catalysts lose much of their activity after having once been used in the reaction, but activity may be restored by adding a small amount of anhydrous or concentrated acid to the spent catalyst. Reactivation may also be accomplished by heating the spent catalyst at a temperature of from about 80° C. to about 120° C. for about an hour, cooling, and filtering through activated charcoal.

At the end of the reaction period, the reaction mixture, if an acid catalyst has been employed in accordance with this invention, will separate into two layers. The layer containing the acyclic terpene reaction product may be separated and the catalyst remaining in the product may be removed in any desirable manner, preferably by washing with water. Any inert solvent which may have been employed in carrying out the reaction may be removed, preferably by distillation under reduced pressure. The product may then be dried in any desired manner. If other catalysts have been employed in accordance with the invention, they may be removed by methods known to the art.

The following specific example illustrates a particular embodiment of the principles underlying this invention. This example is not to be construed as limiting. All parts and percentages are by weight unless otherwise indicated.

*Example*

To 100 parts of monomeric allo-ocimene (60% pure) were added 48 parts of ethyl mercaptan and 170 parts of 85% orthophosphoric acid, and the mixture was agitated at 25° C. to 30° C. for 11 hours in a rotating autoclave. The allo-ocimene employed contained in addition to the allo-ocimene, alpha-pinene, dipentene, and a small amount of unidentified terpenes. The resulting mixture was then allowed to stand at about 23° C. for 48 hours. The mixture was found to have separated into two layers, the one containing the treated allo-ocimene and the other, the acid. The former was separated and water-washed to remove the acid present. Unreacted mercaptan was removed by distillation at 20 mm. and at 40° C. The product was a light-colored oil which analyzed 8.7% sulfur.

It is believed that the alkyl mercaptan when employed in accordance with this invention undergoes an addition reaction at the unsaturated centers of the acyclic terpene and polymerized acyclic terpene resulting in the formation of an acyclic terpene alkyl sulfide.

It will be understood that it is not the intent to limit the instant invention to the theoretical limitations as hereinbefore described but that the invention as contemplated is directed to the products resulting from the application of the methods of the invention as broadly described.

The sulfur-containing compounds of acyclic terpenes produced in accordance with this invention may be used as flotation agents. They may, in addition, be used as intermediates for the production of plasticizers for halogenated rubber, adhesives, etc.

This application is a division of my application for United States Letters Patent, Serial No. 396,219, filed May 31, 1941, which application in turn is a continuation-in-part of my application for United States Letters Patent, Serial No. 382,749, filed March 11, 1941.

What I claim and desire to protect by Letters Patent is:

1. The reaction product of a material selected from the group consisting of the monomers and polymers of acyclic terpenes having three double bonds per molecule, and an alkyl mercaptan.

2. The reaction product of an acyclic terpene having three double bonds per molecule, and an alkyl mercaptan.

3. The reaction product of a polymer of an acyclic terpene having three double bonds per molecule, and an alkyl mercaptan.

4. The reaction product of allo-ocimene and an alkyl mercaptan.

5. The reaction product of allo-ocimene and ethyl mercaptan.

6. The reaction product of myrcene and an alkyl mercaptan.

7. The method of producing a new composition of matter which comprises reacting a material selected from the group consisting of the monomers and polymers of an acyclic terpene having three double bonds per molecule, with an alkyl mercaptan in the presence of an acid catalyst until reaction is at least partially complete.

8. The method of producing a new composition of matter which comprises reacting at a temperature within the range of from about 0° C. to about 250° C. a material selected from the group consisting of monomers and polymers of an acyclic terpene having three double bonds per molecule, with an alkyl mercaptan in the presence of an acid catalyst until reaction is at least partially complete.

9. The method of producing a sulfur-containing compound of allo-ocimene which comprises reacting allo-ocimene with an alkyl mercaptan in the presence of an acid catalyst until isomerization is at least partially complete.

10. The method of producing a sulfur-containing compound of allo-ocimene which comprises reacting allo-ocimene with an alkyl mercaptan in the presence of phosphoric acid until reaction is at least partially complete.

11. The method of producing a sulfur-containing compound of myrcene which comprises reacting myrcene with an alkyl mercaptan in the presence of an acid catalyst until reaction is at least partially complete.

ALFRED L. RUMMELSBURG.